R. P. ELLIOTT.
PISTON RING.
APPLICATION FILED MAR. 19, 1919.

1,386,998.

Patented Aug. 9, 1921.
2 SHEETS—SHEET 1.

Inventor:
Richard P. Elliott
by Jas. H. Churchill
Atty.

R. P. ELLIOTT.
PISTON RING.
APPLICATION FILED MAR. 19, 1919.
1,386,998.
Patented Aug. 9, 1921.
2 SHEETS—SHEET 2.
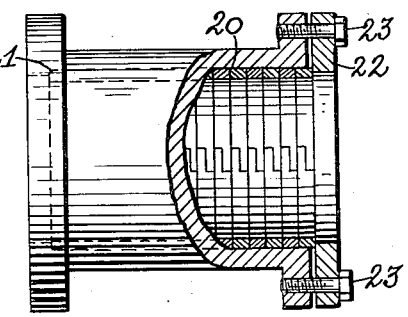
Fig. 7.
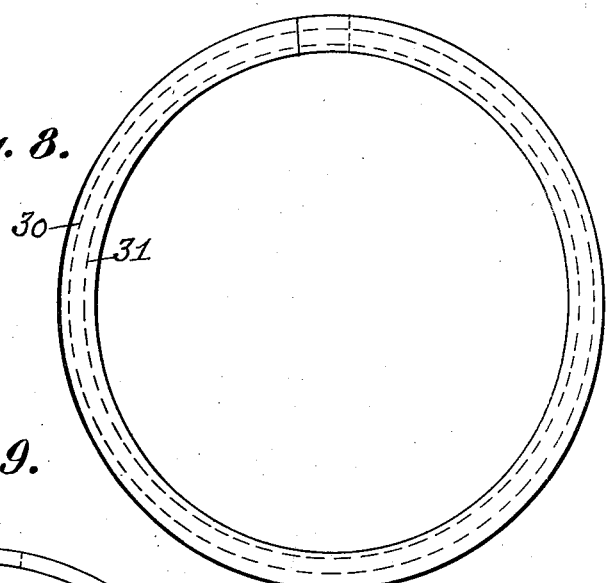
Fig. 8.
Fig. 9.
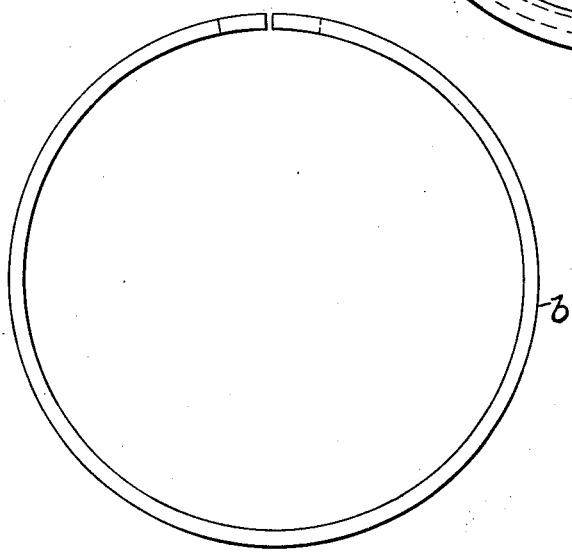
Inventor:
Richard P. Elliott
by Jas. H. Churchill
atty.

UNITED STATES PATENT OFFICE.

RICHARD P. ELLIOTT, OF LEXINGTON, MASSACHUSETTS.

PISTON-RING.

1,386,998.　　　　　　Specification of Letters Patent.　　Patented Aug. 9, 1921.

Application filed March 19, 1919.　Serial No. 283,571.

*To all whom it may concern:*

Be it known that I, RICHARD P. ELLIOTT, a citizen of the United States, residing in Lexington, in the county of Middlesex and State of Massachusetts, have invented an Improvement in Piston-Rings, of which the following description, in connection with the accompanying drawings, is a specification, like characters on the drawings representing like parts.

This invention relates to expansible and contractible piston rings and has for its object to provide a piston ring which is of novel construction and highly efficient in operation, as will be described.

The invention is capable of being embodied in piston rings of any desired size, but especially in rings of small size which are used in motors having cylinders of small diameters and pistons having shallow grooves.

A piston ring embodying this invention can be provided with a relatively long slot, either radial or oblique, whereby long step laps or long diagonal cut laps may be provided as desired, and is further provided with substantially parallel inner and outer surfaces which are concentric and form true circles in the closed-in condition of the ring, and which are formed while the ring is in its closed-in condition and under maximum spring tension, and which are continuous or unbroken and substantially smooth and whose molecular structure is not disturbed or distorted in order to impart to the ring the spring tension employed to expand the ring, and whose outer and inner circumferences retain their substantially parallel relation when expanded and are capable of exerting substantially equal radial pressure against the cylinder walls at all points.

In order that the invention may be fully comprehended I will describe in detail not only the ring but also the method preferred by me for making the same.

The particular features of the invention will be pointed out in the claims at the end of this specification.

Figure 1 represents in its closed-in condition an expansible and contractible piston ring embodying this invention.

Fig. 2, a rough casting on a smaller scale from which the ring shown in Fig. 1 is made.

Fig. 7 represents the rings shown in Fig. 6 as assembled in a fixture ready to have their inner circumferences machined concentric with their outer circumference.

Fig. 8 illustrates the ring blank shown in Fig. 3 as closed in and by dotted circles the ring made from said blank, and Fig. 9, the finished ring shown in Fig. 1 expanded to its normal position.

Figure 1:
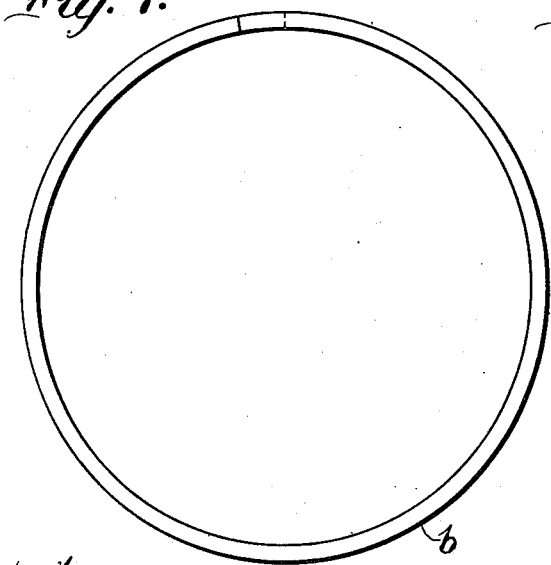
Figure 2:
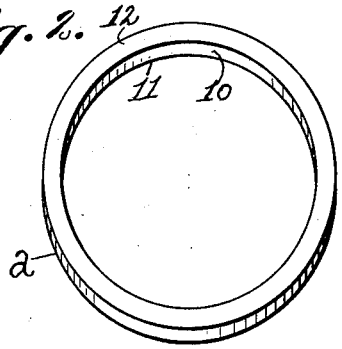

Referring to the drawing, $a$ Fig. 2 represents a rough ring blank from which my improved ring $b$ shown in Figs. 1 and 9 is made. The blank ring $a$ may be an individually cast ring or it may be one cut off from the familiar "pot" form. In the production of the finished ring $b$ from the rough ring blank $a$, a series of steps or operations are performed. These operations may be briefly set forth as follows: The inside wall 10 of the ring blank $a$ is first machined to remove the inequalities therein, after which, the edges or sides 11, 12 of the ring blank $a$ are machined to remove inequalities and some portions of the scale and bring said edges to a condition where they are substantially parallel in the case of the individually cast ring. The surfaces 11 and 12 are then machined to finish them to a smooth, level and substantially parallel relation and to a predetermined thickness.

The next operation involves the rough machining of the outside circumference of the ring blank to remove the scale left by casting.

Figure 6:
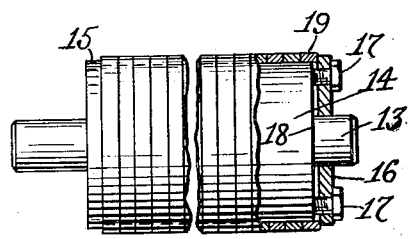
Fig. 6 represents a plurality of the contracted rings shown in Fig. 5 as assembled on an arbor ready to have their outer circumference machined to a true circle.

In order to permit of high speed production, a number of the ring blanks $a$ treated as above described, may be mounted upon a fixture as indicated in Fig. 6, wherein 13 represents an arbor or mandrel, having an enlarged body 14 and a shoulder 15 at one end. The opposite end of the enlarged body is provided with a retaining member or disk 16, secured to the body member 14 by means of screws 17 or any other suitable means so as to firmly clamp the ring blanks on the mandrel.

Figure 4:
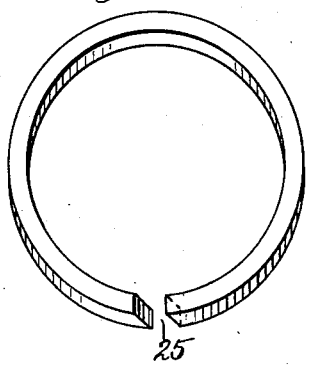
Fig. 4 represents a rough casting provided with a diagonal lap.
Figure 3:
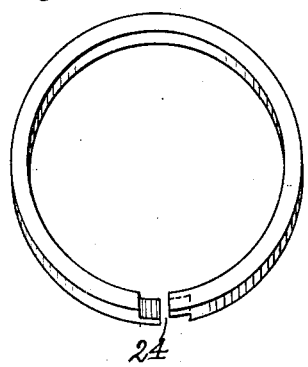
Fig. 3 represents the casting shown in Fig. 2 as slotted to form step laps preparatory to providing the same with uniform tension.

It will be seen that such number of ring blanks $a$ may be mounted on the body 14 that they fill up the space between the shoulder 15 and the end 18 of the body 14, which latter is of such length as to insure that the outer ring blank of the series, indicated at 19, will project slightly beyond the end 18, so that when the disk or retaining member 16 is drawn into operating position by the screws 17, the series of ring blanks will be confined between the shoulder 15 and the member 16, with sufficient pressure to firmly hold them, and so as to leave the outer circumferences of the series of ring blanks assembled on the body member 14, free and unobstructed and in condition to be machined roughly, after which they are removed for the next operation, which consists in slotting the ring blanks to provide long step laps as indicated at 24, Fig. 3, or to provide long diagonal cut laps as indicated at 25 in Fig. 4, as may be desired. When the ring blanks have been slotted, they are next contracted or closed-in, which is preferably accomplished by means of a flexible closing-in or contracting device, indicated at 26, Fig. 5, and which is applied to the outer circumference of each individual slotted ring. The closing-in device forms the subject matter of U. S. Patent No. 1,258,664 granted to me Mar. 12, 1918, to which reference may be had for a detailed description of the same.

Figure 5:
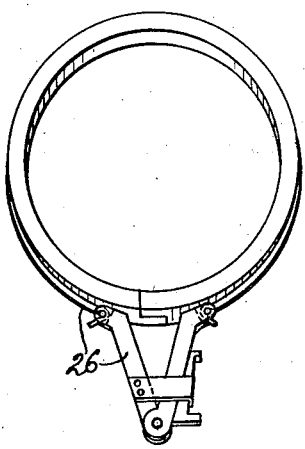
Fig. 5 represents the ring shown in Fig. 3 as contracted.

By the use of said device, I am enabled to close-in or contract the rings naturally and impart to them a maximum spring tension which is inherent in the ring without subjecting them to undue local restraint. This condition is shown in Fig. 5. The contracted rings may now be again mounted upon the fixture shown in Fig. 6, the rings being maintained in their contracted condition by the flexible contracting devices as set forth in said patent. When a sufficient number of rings have been mounted on the body portion 14 of the arbor or fixture shown in Fig. 6, they are clamped thereon between the shoulder 15 and clamping member or disk 16 as above described and held in their closed or contracted position by side pressure, and when thus clamped, the flexible closing-in devices 26 are removed, and the outer circumferences of the contracted rings are machined approximately to finished size and to form true circles concentric with the center of the arbor 13, which true circle is indicated by the dotted line circle 30 in Fig. 8. At the close of this step or operation, the slotted rings are dismounted and placed in a fixture indicated in Fig. 7, the inner bore of which, indicated at 20, is truly circular, concentric with the axis of the machine upon which the fixture is mounted, and of the same diameter as the outer circumferences 30 of the rings machined on the fixture shown in Fig. 6. The fixture shown in Fig. 7, is provided with a shoulder 21, and a plate 22 is so arranged that when the screws 23 are tightened, the slotted rings are held firmly between the shoulder 21 and plate 22, by pressure applied to the sides of the ring, so that the boring operation can be performed upon the inner circumference of the rings, and the latter are provided with inner circumferences indicated by the dotted line circle 31 in Fig. 8 which are true circles when the rings are in their contracted position, which circles 31 are practically concentric with the outer circumferences 30 of said rings, which latter are thus made of uniform thickness throughout their circumferential length, and whose inner and outer surfaces are continuous or unbroken and practically smooth, and whose molecular structure is not distorted in order to impart spring tension to the ring. Upon the completion of the boring operation, the rings are removed, expanded by such removal, again contracted by the flexible closing-in device 26 and mounted a third time upon the arbor or fixture shown in Fig. 6, whereupon a final finishing operation is performed upon the outer circumferences of the rings, bringing them to their predetermined diameter and providing a smooth round external wearing surface and producing the finished ring shown in Figs. 1 and 9. It will be noted that the rings are allowed to expand and assume their natural position between operations subsequent to the slotting operation, thus relieving all strains, and by the use of the flexible contracting device the rings are closed-in without undue local restraint, and any deformities caused by inequalities in the metal are thus provided for, and a uniform spring tension is imparted to them. By the operations above described, a piston ring is produced which is illustrated in Fig. 1 in its closed-in condition and in Fig. 9 as in its expanded or normal condition and from which all of the scale has been removed, unequal strains eliminated and which is of uniform radial thickness, in that it is provided with substantially parallel inner and outer circumferential walls for the entire length of the same and which will assume a truly circular form when closed-in to operating position. Furthermore such rings when in their natural or expanded position assume an approximately elliptical form with walls on each side of the slot substantially parallel and yet having curves of varying radii, which is due to the flexible closing-in fixtures shown in Fig. 5, for when the slotted rings are closed in by the flexible fixtures applied as shown in Fig. 5, the ring naturally bends or springs in the greatest amount at a point directly opposite the slot 24, as that is the point at which the greatest leverage is exerted. The bending of the walls of the ring is gradually lessened on either side of a point opposite the slot 24 as we approach the slot and to points a short distance on either side of the slot.

At these points no bending takes place. After the rings have been closed in as described, machined inside and out to true circles, and allowed to expand to their natural position, it is found that the curvature of the substantially parallel inner and outer walls will have the greater radii where they are bent the most, the radii gradually decreasing to the points nearest the slot and therefore nearest to the free ends of the ring where no bending took place, and at these points the radii of the curves of the outer and inner walls approximately equal the radii of the circles of the ring when closed, and consequently when the ring is expanded within a cylinder whose inner wall is a true circle, the free ends of the ring and the portions adjacent thereto will be engaged with and caused to bear against the cylinder wall with substantially the same pressure as the remaining portion of the ring, with the result that the ring for its entire circumferential length bears against and truly fits the cylinder wall.

From the above description it will be observed that step laps formed by radially slotting the ring blank at 24, Fig. 3, or the cut laps formed by obliquely slotting the ring at 25, Fig. 4, are made in the ring blank $a$, the metal of which is under substantially no tension, but is placed under maximum tension when the slotted ring blank is closed-in so that its free ends abut as represented in Figs. 5 and 8. It will be also noted that while the slotted ring blank is under maximum tension, it is machined outside and inside to obtain a slotted ring having parallel outer and inner circumferences which are concentric true circles in the closed-in condition of the ring as indicated by the dotted line circles 30, 31 in Fig. 8. It will also be observed that the machining operations leave the inner and outer circumferences of the ring substantially smooth and do not subject the metal of these surfaces to any action which would stretch, distort or disturb the molecular condition of the metal, and as a result when the closing-in pressure is removed, the ring will expand or open out to substantially the position or condition of the ring before being closed in, which position or condition is substantially that of the ring blank $a$ when slotted as shown in Figs. 3 and 4.

When the ring indicated by the dotted lines 30, 31 in Fig. 8 is allowed to expand, the metal of the ring being materially thinner than the ring blank from which the ring is machined, is liable when relieved from strain, to change the shape of the ring very slightly, so that when again closed-in, the outer circumference at the abutting free ends of the ring may be slightly out of a true circle, and to again bring them into a true circle the final outside or finishing machining operation on the mandrel 13, 14 is preferably performed, so that the finished ring shown in Fig. 1 can thereafter be opened and closed with the assurance that the outer circumference of the closed-in ring is a true circle concentric with the center of the inner circumference of said ring. It will also be observed that in all positions of the finished ring the outer and inner circumferences are parallel.

Piston rings having substantially parallel inner and outer circumferential walls are highly desirable because the rings may then be made of sufficient size to fill up, in a great measure, the grooves in the piston, thus preventing leakage of oil and the accumulation of carbon in the piston ring grooves, and the rings exert a uniform pressure in all directions on the walls of the cylinder, in order that the wear may be as uniform as possible and that the cylinder walls shall not be worn out of a true circular shape.

In my improved ring a wide slot either lapped or diagonal can be made so as to obtain by the closing-in operation a sufficient spring tension to insure outward pressure of the ring against the cylinder walls to properly seal the space between the piston and the cylinder walls and prevent leakage by the piston along the cylinder walls, and by making the outer and inner walls of the ring parallel and concentric the ring can expand to take care of the reduction in diameter of the ring and the increase in diameter of the cylinder walls due to wear, while maintaining an overlap at the ends of the ring without distortion or disturbance of the molecular structure of the inner surface of the ring, which is rendered smooth, continuous or unbroken by the boring operation performed upon the inner surface of the ring blank above described. It will therefore be seen, that the finished ring shown in Fig. 1, is provided with a smooth, continuous or unbroken inner surface, with a long lap, with walls of substantially uniform thickness throughout the circumferential length of the ring, with concentric outer and inner circumferences when closed-in and with parallel outer and inner circumferences having curves of different radii when expanded.

Claims:

1. An inherently resilient piston ring of uniform radial thickness having its end portions curved on radii substantially the radius of the cylinder in which they are intended for use and the intermediate portion of gradually increasing curvature to a point substantially opposite the slot when the ring is open.

2. An inherently resilient piston ring of uniform radial thickness whose outer and inner surfaces have substantially equal tension and whose end portions are curved on radii substantially the radius of the cylinder in which they are intended for use and whose intermediate portion is of gradually increasing curvature to a point opposite the slot when the ring is open.

3. An inherently resilient piston ring of uniform radial thickness and of uniform radius when closed in and under compression, and when open having its end portions curved on radii the same as the radius when closed in and substanitally the radius of the cylinder in which they are intended for use and the intermediate portion of gradually increasing curvature to a point substantially opposite the slot.

In testimony whereof, I have signed my name to this specification.

RICHARD P. ELLIOTT.